(12) United States Patent
Werneck et al.

(10) Patent No.: US 9,443,034 B2
(45) Date of Patent: Sep. 13, 2016

(54) ESTIMATING INFLUENCE USING SKETCHES

(71) Applicant: Microsoft Corporation, Redmond, WA (US)

(72) Inventors: Renato F. Werneck, San Francisco, CA (US); Daniel Delling, Sunnyvale, CA (US); Thomas Pajor, Mountain View, CA (US); Edith Cohen, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 166 days.

(21) Appl. No.: 14/290,209

(22) Filed: May 29, 2014

(65) Prior Publication Data

US 2015/0347625 A1    Dec. 3, 2015

(51) Int. Cl.
*G06F 17/30* (2006.01)

(52) U.S. Cl.
CPC ... *G06F 17/30958* (2013.01); *G06F 17/30519* (2013.01)

(58) Field of Classification Search
USPC .................................................. 707/708, 798
See application file for complete search history.

(56) References Cited

U.S. PATENT DOCUMENTS

| | | | | |
|---|---|---|---|---|
| 7,962,520 B2 * | 6/2011 | Patterson | .......... | G06F 17/30312 707/791 |
| 8,359,276 B2 | 1/2013 | Zhuang et al. | | |
| 8,370,313 B2 * | 2/2013 | Snow | ................ | G06F 17/30864 707/694 |
| 8,619,084 B2 * | 12/2013 | Curbera | ................ | G06Q 10/06 345/440 |
| 8,631,044 B2 * | 1/2014 | Jebara | .................... | G06Q 10/04 707/798 |
| 8,645,412 B2 * | 2/2014 | Woodruff | .......... | G06F 17/30486 707/769 |
| 8,666,920 B2 * | 3/2014 | Najork | ............... | G01C 21/3446 706/46 |
| 8,688,701 B2 * | 4/2014 | Ghosh | ............... | G06F 17/30699 706/54 |
| 8,868,599 B2 * | 10/2014 | Woodruff | ................ | G06F 17/30 707/769 |
| 8,959,525 B2 * | 2/2015 | Agarwal | ............... | G06F 9/4881 718/105 |
| 2011/0295626 A1 | 12/2011 | Chen et al. | | |
| 2012/0259915 A1 | 10/2012 | Bhatt et al. | | |

FOREIGN PATENT DOCUMENTS

| | | |
|---|---|---|
| CN | 101859315 A | 10/2010 |
| CN | 102819664 A | 12/2012 |

OTHER PUBLICATIONS

McGregor, Andrew, "Homomorphic Sketches Shrinking Big Data without Sacrificing Structure", In Proceedings of Succinct Data Representations and Applications, Sep. 17, 2013, 24 pages.

(Continued)

*Primary Examiner* — Kim Nguyen
(74) *Attorney, Agent, or Firm* — Judy Yee; Micky Minhas (57) ABSTRACT

A graph that includes multiple nodes and edges is received. Multiple instances of the graph are generated by randomly instantiating the edges according to either a binary independent cascade model or a randomized edge length independent cascade model. Where the binary independent cascade model is used, combined reachability sketches are generated for each node across all instances of the graph. Where the randomized edge length independent cascade model is used, combined all-distances sketches are generated for each node across all instances of the graph. Depending on which model is used, the combined reachability or all-distances sketches are used to estimate the influence of nodes in the graph or to estimate a subset of nodes from a graph of a specified size with a maximum influence using a greedy algorithm.

8 Claims, 5 Drawing Sheets

(56) References Cited

OTHER PUBLICATIONS

Chen, et al., "Scalable Influence Maximization in Social Networks under the Linear Threshold Model", In IEEE 10th International Conference on Data Mining, Dec. 13, 2010, 10 pages.

Gubichev, et al., "Fast and Accurate Estimation of Shortest Paths in Large Graphs", In Proceedings of the 19th ACM international conference on Information and knowledge management, Oct. 26, 2010, 10 pages.

Abrahao, et al., "Trace Complexity of Network Inference", In Proceedings of the 19th ACM SIGKDD International Conference on Knowledge Discovery and Data Mining, Aug. 14, 2013, pp. 1-25.

Backstrom, et al., "Group Formation in Large Social Networks: Membership, Growth, and Evolution", In Proceedings of the 12th ACM SIGKDD International Conference on Knowledge Discovery and Data Mining, Aug. 20, 2006, pp. 44-54.

Bader, et al., "Graph Partitioning and Graph Clustering", In Proceedings of 10th DIMACS Implementation Challenge Workshop, Feb. 13, 2013, 17 pages.

Bavelas, A. A., "A Mathematical Model for Small Group Structures", In Proceedings of Human organization, Mar. 26, 2014, 1 page.

Chen, et al., "Scalable Influence Maximization for Prevalent Viral Marketing in Large-Scale Social Networks", In Proceedings of the 16th ACM SIGKDD International Conference on Knowledge Discovery and Data Mining, Jul. 25, 2010, 10 pages.

Chen, et al., "Efficient Influence Maximization in Social Networks", In Proceedings of the 15th ACM SIGKDD International Conference on Knowledge Discovery and Data Mining, Jun. 28, 2009, 9 pages.

Cohen, Edith, "Size-Estimation Framework with Applications to Transitive Closure and Reachability", In Journal of Computer and System Sciences archive, vol. 55 Issue 3, Dec. 1997, pp. 1-24.

Cohen, Edith, "All-Distances Sketches, Revisited: Hip Estimators for Massive Graphs Analysis", In Technical Report 1306.3284, Retrieved on: Mar. 26, 2014, pp. 1-15.

Cohen, et al., "Scalable Similarity Estimation in Social Networks: Closeness, Node Labels, and Random Edge Lengths", In Proceedings of the first ACM Conference on Online Social Networks, Oct. 7, 2013, 12 pages.

Cohen, et al., "Spatially-Decaying Aggregation Over a Network: Model and Algorithms", In Proceedings of the ACM SIGMOD International Conference on Management of Data, Jun. 13, 2004, 12 pages.

Cohen, et al., "Summarizing Data using Bottom-K Sketches", In Proceedings of the Twenty-Sixth Annual ACM Symposium on Principles of Distributed Computing, Aug. 12, 2007, pp. 225-234.

Cohen, et al., "Leveraging Discarded Samples for Tighter Estimation of Multiple-Set Aggregates", In Proceedings of the Eleventh International Joint Conference on Measurement and Modeling of Computer Systems, Jun. 15, 2009, 16 pages.

Dangalchev, Chavdar, "Residual Closeness in Networks", In Proceedings of Phisica A 365, Jan. 18, 2006, pp. 556-564.

Domenico, et al., "The Anatomy of a Scientific Rumor", In Scientific Reports 3, Oct. 18, 2013, pp. 1-9.

Feige, Uriel, "A Threshold of In n for Approximating Set Cover", In Journal of the ACM, vol. 45, No. 4, Jul. 1998, pp. 634-652.

Goldenberg, et al., "Talk of the Network: A Complex Systems Look at the Underlying Process of Word-of-Mouth", In Journal of Marketing Letters, vol. 12, Issue 3, Aug. 2001, pp. 211-223.

Goyal, et al., "Learning Influence Probabilities in Social Networks", In Proceedings of the Third ACM International Conference on Web Search and Data Mining, Feb. 4, 2010, 10 pages.

Goyal, et al., "A Data-based Approach to Social Influence Maximization", In Proceedings of the VLDB Endowment, vol. 5, Issue 1, Aug. 27, 2012, pp. 73-84.

Goyal, et al., "Celf++: Optimizing the Greedy Algorithm for Influence Maximization in Social Networks", In Proceedings of the 20th International Conference Companion on World Wide Web, Mar. 28, 2011, pp. 47-48.

Jung, et al., "IRIE: Scalable and Robust Influence Maximization in Social Networks", In Proceedings of 12th IEEE International Conference on Data Mining, Dec. 10, 2012, pp. 1-19.

Kempe, et al., "Maximizing the Spread of Influence Through a Social Network", In Proceedings of the Ninth ACM SIGKDD International Conference on Knowledge Discovery and Data Mining, Aug. 24, 2003, 10 pages.

Leskovec, et al., "Graph Evolution: Densification and Shrinking Diameters", In journal of ACM Transactions on Knowledge Discovery from Data, vol. 1, Issue 1, Mar. 2007, pp. 1-41.

Leskovec, et al., "Cost-Effective Outbreak Detection in Networks", In Proceedings of the 13th ACM SIGKDD International Conference on Knowledge Discovery and Data Mining, Aug. 12, 2007, pp. 420-429.

Leskovec, et al., "Community Structure in Large Networks: Natural Cluster Sizes and the Absence of Large Well Defined Clusters", In Proceedings of Internet Mathematics, vol. 6, No. 1, Jan. 1, 2009, pp. 1-66.

Nemhauser, et al., "An Analysis of the Approximations of Maximizing Submodular Set Functions", In Mathematical Programming, vol. 14, Issue 1, Retrieved on: Mar. 27, 2014, pp. 265-294.

Palmer, et al., "ANF: a Fast and Scalable Tool for Data Mining in Massive Graphs", In Proceedings of the Eighth ACM SIGKDD International Conference on Knowledge Discovery and Data Mining, Jul. 23, 2002, pp. 81-90.

Richardson, et al., "Trust Management for the Semantic Web", In Proceedings of the Second International Semantic Web Conference, Oct. 20, 2003, 17 pages.

Richardson, et al., "Mining Knowledge-Sharing Sites for Viral Marketing", In Proceedings of the Eighth ACM SIGKDD International Conference on Knowledge Discovery and Data Mining, Jul. 23, 2002, 10 pages.

Saito, et al., "Prediction of Information Diffusion Probabilities for Independent Cascade Model", In Proceedings of the 12th International Conference on Knowledge-Based Intelligent Information and Engineering Systems, Sep. 3, 2008, 5 pages.

Leskovec, Jure, "Stanford Network Analysis Project", Retrieved on: Mar. 28, 2014 Available at: http://snp.stanford.edu.

Yang, et al., "Defining and Evaluating Network Communities Based on Ground-Truth", In Proceedings of IEEE International Conference on Data Mining, Dec. 10, 2012, 10 pages.

Boldi, et al., "Axioms for Centrality", Available at <<http://www.tandfonline.com/doi/abs/10.1080/15427951.2013.865686#.U1n_j7WcXHo>>, In Internet Mathematics, Apr. 4, 2014, 2 Pages.

Borgs, et al., "Maximizing Social Influence in Nearly Optimal Time", In Proceedings of the Twenty-Fifth Annual ACMSIAM Symposium on Discrete Algorithms, Jan. 5, 2014, pp. 946-957.

Cohen, et al., "Tighter Estimation Using Bottom-k Sketches", In Proceedings of the VLDB Endowment, vol. 1, Issue 1, Aug. 2008, pp. 213-224.

Gomez-Rodriguez, et al., "Uncovering the Temporal Dynamics of Diffusion Networks", In Proceedings of the 28th International Conference on Machine Learning, Jul. 28, 2011, pp. 561-568.

Gomez-Rodriguez, et al., "Inferring Networks of Diffusion and Influence", In Proceedings of the 16th ACM SIGKDD International Conference on Knowledge Discovery and Data Mining, Jul. 25, 2010, pp. 1019-1028.

Horvitz, et al., "A Generalization of Sampling Without Replacement From a Finite Universe", In Journal of the American Statistical Association, vol. 47, Issue 260, Dec. 1952, pp. 663-685.

Opsahl, Tore, "Closeness Centrality in Networks with Disconnected Components", Published on: Mar. 20, 2010, Available at: http://toreopsahl.com/2010/03/20/closeness-centrality-in-networks-with-disconnected-components/.

\* cited by examiner

ESTIMATING INFLUENCE USING SKETCHES

BACKGROUND

Propagation of contagion is a fundamental process in social, biological, and physical networks. Graphs can be used to model a network, and propagation of contagion can be used to model the spread of information, influence, or a viral infection with respect to the nodes of the graph. Diffusion patterns in the graph can be specified by a probabilistic model, such as independent cascade (IC), or captured by a set of representative traces.

Basic computational problems in the study of diffusion are influence queries. These queries include determining the influence of a specified seed set of nodes in a graph, and identifying the most influential seed set of a given size in the graph (i.e., influence maximization). Answering an influence query may involve edge traversals in hundreds of graph instances, and may not scale well for very large graphs. Influence maximization is hard even to approximate. Both in theory and practice, the standard is the greedy algorithm, which iteratively selects a node which maximizes a marginal gain in influence and adds it to the seed set. However, the greedy algorithm does not scale well for graphs with more than a few million edges.

SUMMARY

A graph that includes multiple nodes and edges is received. Multiple instances of the graph are generated by randomly instantiating the edges according to, for example, a binary independent cascade model or a randomized edge length independent cascade model. Where the binary independent cascade model is used, combined reachability sketches are generated for each node across all instances of the graph. Where the randomized edge length independent cascade model is used, combined all-distances sketches are generated for each node across all instances of the graph. Depending on which model is used, the combined reachability or all-distances sketches are used to estimate the influence of nodes in the graph or to estimate a subset of nodes from a graph of a specified size with a maximum influence using a greedy algorithm.

In an implementation, a graph is received by a computing device. The graph includes nodes and edges. For each node of the graph, a sketch is computed by the computing device. The sketch may be either a reachability sketch or an all-distances sketch. An influence query is received by the computing device. The influence query may be a query for an estimate of the influence of a subset of nodes or for an estimate of a subset of nodes of a specified size with a maximum combined influence. A result is determined in response to the influence query using one or more of the computed sketches by the computing device. The determined result is provided in response to the influence query by the computing device.

In an implementation, sketches are received by a computing device. Each sketch is associated with a plurality of nodes of a graph. Each sketch may be one or more of a reachability sketch or an all-distances sketch. An influence query is received for a subset of the nodes of a specified size having a maximum influence by the computing device. A first node of the plurality of nodes that when added to the subset of the nodes increases an influence of the subset of the nodes by the greatest amount is determined using the sketch associated with the first node and the sketches associated with the nodes in the subset of the nodes by the computing device. The determined first node is added to the subset of the nodes by the computing device. That the subset of the nodes is of the specified size is determined by the computing device. In response to the determination, the subset of the nodes is provided by the computing device.

This summary is provided to introduce a selection of concepts in a simplified form that are further described below in the detailed description. This summary is not intended to identify key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
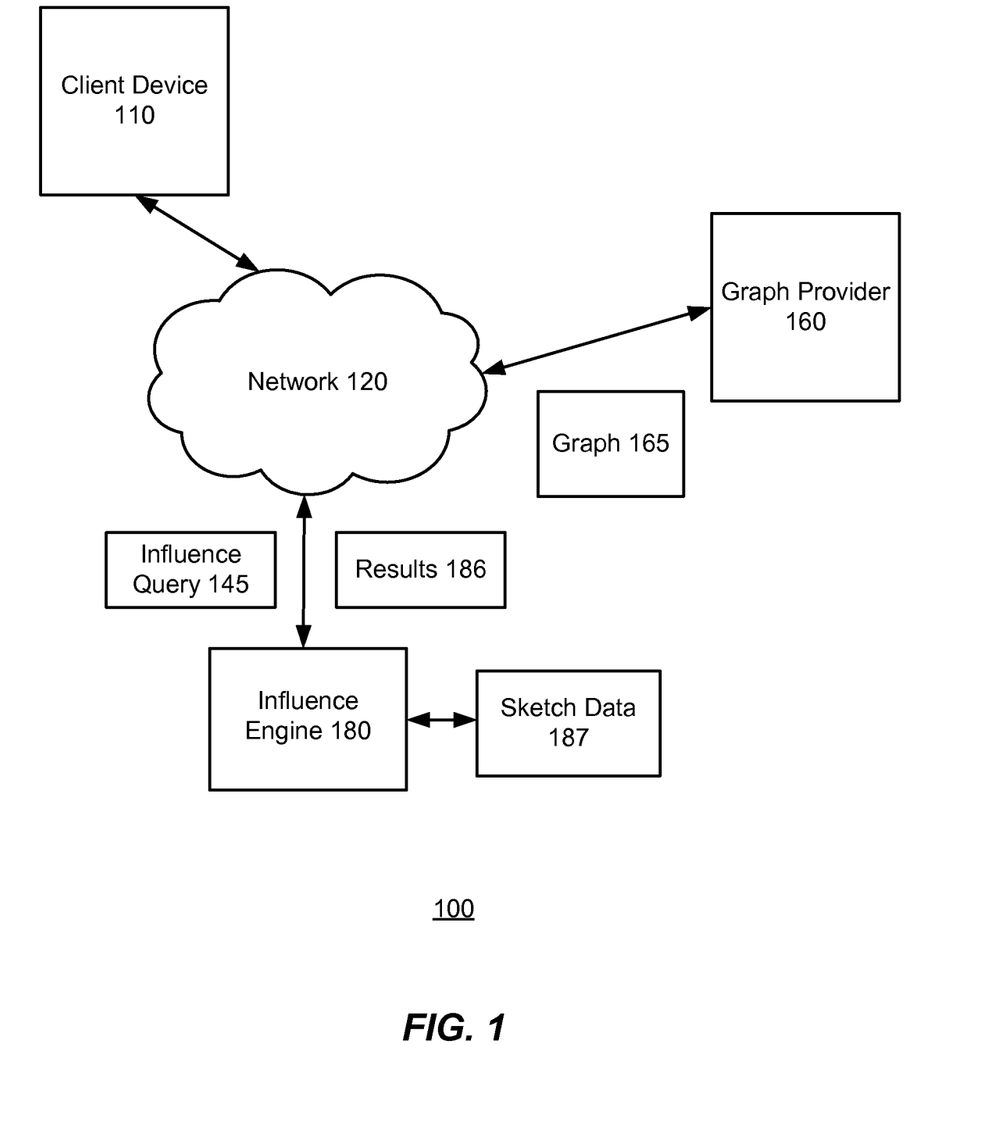
FIG. 1 shows an environment for answering influence queries.

FIG. 1 shows an environment 100 for answering influence queries 145 on graphs. The graphs may include a plurality of nodes and edges and may include both directed and undirected graphs. In addition, the graphs may be weighted or unweighted. A graph may represent a variety of entities and structures such a social network, the Internet, populations of humans or animals, and cities, for example.

An example of an influence query 145 includes a request to determine the influence of a subset of nodes S from a graph G. The influence query 145 may include identifiers of the one or more nodes in the subset. Another example of an influence query 145 may be to identify a subset of nodes of a particular size that includes the nodes from the graph G with the highest combined influence. The influence query 145 may include an indicator of the desired size of the subset of nodes. This type of query 145 is known as influence maximization.

The influence of a node is a measure of how connected a particular node in the graph is to the other nodes of a graph. Identifying nodes with high influence can have many uses in a variety of fields. For example, for social networking, identifying users with high influence can be used for marketing purposes to determine which users to give a free product to in order to maximize the exposure of the product. As another example, for public health, the influence of users can be used to model how a disease may be spread, or to identify which users to target for vaccination.

One model for the diffusion (or contagion) of information in graphs based on influence is known as independent cascade (IC) in which an independent random variable is assigned to each edge (u, v) of a graph G to model the influence of the node u on the node v. A single instance of the graph may be created by instantiating the random variables for each edge, and the influence of a particular node may be determined across many of these graph instances.

One version of the IC model is known as binary IC. In binary IC, the random variable assigned to each edge is binary and may be one or zero. The assigned variable represents whether or not the particular edge is live or null. A live edge (u, v) means that once a node u is infected, so is the node v. In such a model, the influence of a particular node can be based on the number of nodes that are infected when the particular node is infected across all of the instances of the graph. As may be appreciated, where the graphs are undirected graphs, the variable assigned to the (directed) edge (u, v) and the edge (v, u) may be different.

Another version of the IC model is known as randomized edge length (REL) IC. Unlike binary IC where the assigned variables are limited to one or zero, in REL IC each edge may be randomly assigned any non-negative variable. Each variable may represent a variety of values such as time. For example, the assigned variable to an edge (u, v) may represent how much time may elapse before the node V becomes infected after the node u has become infected. In such a model, the influence of a particular node may similarly be based on the how much the other nodes are infected when the particular node is infected across all of the instances of the graph but may change based on a current time value.

In one version of the IC model, a graph G, with nodes V and edges E may be used to generate a set $\{G^i\}$ of graph instances. A particular instance $G^i = (V, E^i, w^i)$ may be specified by an edge set $E^i$ with lengths $w^i(e) \geq 0$. The influence of a subset of nodes S of a particular instance $G^i$ may be defined using formula 1, where $d_{Su}^i = \min_{v \in S} d_{vu}^i$ is the distance in instance i from S to u and $\alpha$ is a non-increasing function:

$$\inf(G^i, S) = \Sigma_{u \in V} \alpha(d_{Su}^i) \quad (1)$$

The influence of S over all instances $\{G^i\}$ may be defined as the average of the single instance influences where l is the total number of instances using formula 2:

$$\inf(\{G^i\}, S) = \frac{1}{l} \sum_{i \in l} \inf(G^i, S) \quad (2)$$

Using the formulas 1 and 2, one method for solving the influence maximization problem for a seed subset of size S described above is by using a greedy algorithm. For a first iteration, the algorithm starts with the empty seed set S and determines the node from the graph with the greatest influence using the formula 1 and adds the node to S. At each subsequent iteration, the greedy algorithm determines the node from the graph that when added to S results in the greatest increase in influence for the subset (i.e., the node with the highest marginal gain in influence). The algorithm is stopped when the seed set S has the desired size.

For both binary IC and REL IC, determining the influence of a particular node or subset of nodes and solving the influence maximization problem using the greedy algorithm may be computationally expensive for very large graphs. Accordingly, the environment 100 may include an influence engine 180 that estimates influence queries 145 using one or more sketches generated from a graph, rather than directly from the graph as described above. The sketches may be computed in a preprocessing phase resulting in a reduction of processing resources.

The influence engine 180 may be in communication with a graph provider 160 and a client device 110 through a network 120. The client device 110 may include a desktop personal computer, workstation, laptop, personal digital assistant (PDA), smartphone, cell phone, or any WAP-enabled device or any other computing device capable of interfacing directly or indirectly with the network 120. The network 120 may be a variety of network types including the public switched telephone network (PSTN), a cellular telephone network, and a packet switched network (e.g., the Internet). The graph provider 160, the influence engine 180, and the client device 110 may be implemented together or separately using one or more computing devices such as the computing device 500 illustrated with respect to FIG. 5.

The influence engine 180 may receive a graph 165 from the graph provider 160 through the network 120, and may generate a sketch for each node of the graph 165. A sketch of a graph is like a summary of a graph and includes some number of nodes and edges from the graph selected according to a sampling function, potentially with some associated information. The generated sketches may be stored by the influence engine 180 as the sketch data 187.

Depending on the implementation, for binary IC, each generated sketch for a node may be a reachability sketch and may indicate which nodes are reachable in the graph 165 from the node by following paths from the node in the graph 165. Each reachability sketch may be a combined reachability sketch in that it is based on all instances of the graph 165. How each reachability sketch is generated is described further with respect to FIG. 2.

For REL IC, rather than generate reachability sketches, the influence engine 180 may generate what is referred to herein as a combined all-distances sketch for each node. An all-distances sketch for a node 12 includes a random sample of nodes from the graph, where the inclusion probability of a node u in the sample decreases with its distance from v. The combined all-distances sketch for a node may be (conceptually) a combination of the all-distances sketches generated for the node across all instances of the graph 165. The particular methods used to generate the combined all-distances sketches and combined reachability sketches are described further with respect to FIG. 2.

The influence engine 180 may receive an influence query 145 from a client device 110 and may generate an estimate in response to the query using the sketches stored in the sketch data 187. The estimate may be provided by the influence engine 180 to the client device 110 as the results 186.

How the influence engine 180 determines the estimate may depend on both the type of the influence query 145, as well as whether the influence is being determined based on a binary IC model or a REL IC model. Where the influence query 145 is a request to estimate the influence of a subset of nodes in the graph 165 and the instances of the graph 165 are based on the binary IC model, the influence engine 180 may estimate the influence using the reachability sketches associated with each of the nodes in the subset from the sketch data 187. The influence may be estimated by estimating (using the sketches of each node in the subset) the cardinality of the union of the reachability sets of all nodes in the subset. Other methods may be used.

Where the instances of the graph are based on the REL IC model, the influence of the subset may be estimated using the combined all-distances sketches associated with the nodes in the subset and one or more estimators. Other methods may be used.

Where the influence query 145 is an influence maximization request for either a graph 165 with instances generated using either the binary IC model or the REL IC model, the influence engine 180 may determine the subset of nodes of a specified size using a form of the greedy algorithm described above while estimating the influence of the nodes using either the reachability sketches or the combined all-distances sketches associated with each node of the graph 165. The greedy algorithm and its application are described further below with respect to FIG. 2.

Figure 2:
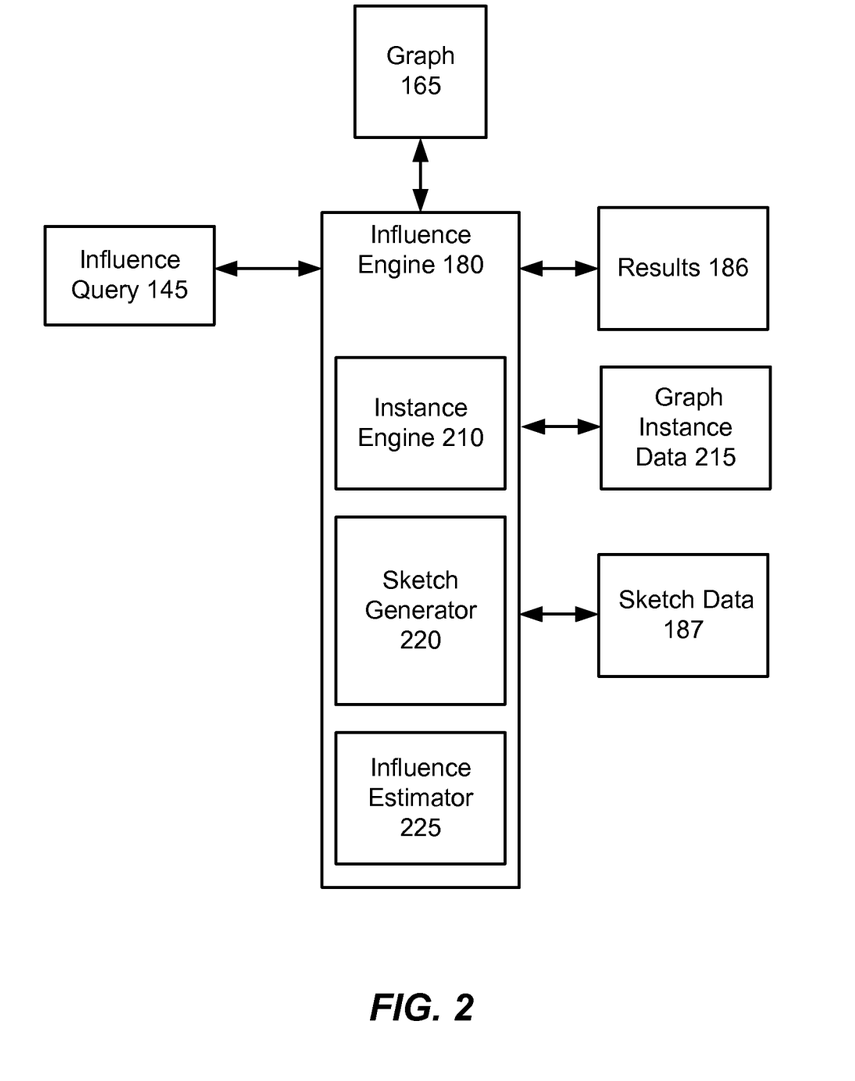
FIG. 2 is an illustration of an implementation of an influence engine.

FIG. 2 is an illustration of an implementation of an influence engine 180. As shown, the influence engine 180 may include several components such as an instance engine 210, a sketch generator 220, and an influence estimator 225. More or fewer components may be supported by the influence engine 180.

The instance engine 210 may receive a graph 165 and may generate one or more instances based on the graph 165. The graph 165 may be received from the graph provider 160 and may include a plurality of edges and nodes. Each edge may further have an associated weight. The generated instances may be stored by the instance engine 210 as the graph instance data 215. The number of instances generated from a graph 165 may be set by a user or administrator, for example.

Where the binary IC model is used, the instance engine 210 may generate an instance from the graph 165 by assigning either a one or a zero to each edge in the graph 165. The one or zero may be randomly assigned to each edge using a biased coin, for example. Other methods for randomly, or pseudo randomly, assigning values may be used. Where a zero is assigned to an edge in an instance of the graph 165, the edge may be deemed to be dead or inactive in the instance. Conversely, where a one is assigned to an edge in an instance of the graph 165, the edge may be deemed to be live or active in the instance.

Where the REL IC model is used, the instance engine 210 may generate an instance from the graph 165 by assigning a positive value to each edge in the graph 165. The positive value assigned to an edge many be randomly selected from a distribution. Any method for randomly, or pseudo randomly, assigning values may be used. The value assigned to an edge may represent a time that a first node associated with the edge may take to infect a second node associated with the edge, for example.

The sketch generator 220 may, for each node in the graph 165, generate a sketch for the node. The sketch generated for each node may be a combined sketch, and may be generated for the node based on all of the instances of the graph 165 generated by the instance engine 210. The generated sketches for each node may be stored by the sketch generator 220 as the sketch data 187.

Where the instances of the graph 165 are based on the binary IC model, each of the generated sketches may be reachability sketches. The reachability sketches may be bottom-k min hash sketches, where k is the size or number of samples in the sketch. Other types of reachability sketches may be used.

For a node u∈$G^i$, the reachability set $R_u^i$ (i.e., all nodes in the instance i that are reachable from the node u) is defined as $R_u^i = \{(v, i) | u \leadsto v \text{ in } G^i\}$ where $u \leadsto v$ means that v is reachable from u. When combining reachability sets across all instances of the graph 165, the combined reachability set $R_u = \{(v, i) | u \leadsto v \text{ in } G^i\}$.

The sketch generator 220 may generate a reachability sketch by, for each node and instance pair (v, i) of a graph 165, associating a random rank value with the pair. Depending on the implementation, the random rank value may be hash based. The random rank value $r_u^i \sim U[0,1]$ may be selected from the uniform distribution of [0, 1].

The combined reachability sketch $X_u$ for the node u may then be generated from the set of the k smallest associated rank values amongst $\{r_v^i | (v, i) \in R_u\}$ by the sketch generator 220 according to formula 3 where Bottom-k of a set is the subset consisting of the k smallest associated rank values:

$$X_u = \text{Bottom-}k\{r_v^i | v \in R_u^i\} \quad (3)$$

In some implementations, the sketch generator 220 may generate the combined reachability sketch for each node by performing sequential pruned graph searches. The sketch generator 220 may rank the node instance pairs based on the assigned random rank values (from lowest to highest). Pruned searches may then be performed using the ranked node instance pairs.

For a node instance pair (u, i), a search may be performed from u using the reversed edges of $G^i$. When a new node v is visited and its current sketch $X_v$ is smaller than k, the value $r_u^i$ may be added to $X_v$. Otherwise the search may pruned at v. Eventually, $X_v$ may include the bottom-k combined reachability sketch of v as described above in the formula 3. Other methods for generating reachability sketches may be used.

Where the graph 165 is based on the REL IC model, each of the generated sketches may be all-distances sketches, and may be used to generate a combined all-distances sketch for each node across all instances of the graph 165. An all-distances sketch for a node v includes a random sample of nodes from the graph, where the inclusion probability of a node u in the sample decreases with its distance from v. The combined all-distances sketch for a node is a combination of all of the all-distances sketches generated for the node for each instance of the graph 165.

The sketch generator 220 may generate a combined all-distances sketch cADS(u) for a node u by, for each node and instance pair (u, i) for a graph 165, associating a random rank value with the pair similarly as described above for the reachability sketches.

The sketch generator 220 may rank the node instance pairs based on the assigned random rank values. Pruned Dijkstra searches may be iteratively performed by the sketch generator 220 using the ranked node instance pairs by increasing rank $r_u^i$ using the reversed edges of $G^i$. When a new node v is visited, a determination is made as to whether there is an entry (x, y)∈cADS(u) where $y \leq d_u^i$. Here cADS(u) is the combined all-distances sketch of x. If so, the Dijkstra search is pruned at V. Otherwise, cADS(v) is updated to include $(r_u^i, d_{vu}^i)$. Other methods for generating combined all-distances sketches may be used.

The influence estimator 225 may generate results 186 in response to a received influence query 145. How the influence estimator 225 generates the results 186 may depend both on the type of influence query 145 (i.e., whether the query is for an estimation of the influence of a subset of the nodes of the graph 165 or to determine a subset of nodes of the graph 165 of a specified size that have a maximum influence) and whether or not the generated instances of the graph 165 are generated using binary IC or REL IC.

Where the instances of the graph 165 are binary IC, the influence estimator 225 may determine the influence of a subset of nodes S identified by the influence query 145 by estimating the cardinality of the union $U_{u \in S} R_u(u, i)$ of the combined reachability sketches $X_u$ for all nodes u in the subset S. In some implementations, when estimating the cardinality of the union of combined reachability sketches, the influence estimator 225 may compute a threshold rank $t_u$ of each node u using formula 4 (where $k^{th}$ indicates the k-th smallest element of the set):

$$t_u = k^{th}(\{r_v^i | v \in R_u^i\}), \qquad (4)$$

The influence estimator 225 may estimate the cardinality $|R_u|$ as $(k-1)/t_u$. The influence estimator 224 may further estimate the cardinality of the union $U_{u \in S} R_u$ using the bottom-k sketches of each set $R_u$ for $u \in S$. In some implementations, the influence estimator 225 may estimate the cardinality of the union by computing the bottom-k sketch of the union which has a threshold value $t = k^{th}\{U_{u \in S} X_u\}$ using the cardinality estimator $(k-1)/t$.

The cardinality of the union $U_{u \in S} R_u$ may be estimated by the influence estimator using formula 5:

$$|\widetilde{U_{v \in S} R_v}| = \sum_{Z \in U_{v \in S}} X_v \setminus \{t_v\} \frac{1}{\max_{u \in S | z \in X_u \{t_u\}} t_u} \qquad (5)$$

Where the influence query 145 is a request to determine a subset S of an indicated size having a maximum influence, the influence estimator 225 may determine the subset S using the greedy algorithm described above. However, rather than compute the actual influence using the formula 2, the influence estimator 225 may use the combined reachability sketches and may estimate the influence of the subset using the formula 5.

In some implementations, the influence estimator 225 may apply the greedy algorithm by first creating a priority queue for each node u in the graph 165. Initially, the nodes in the graph may be ordered based on their estimated influence or $|R_u|$. The nodes may also be associated with a freshness value that indicates the last time that the influence value associated with the node was updated.

For the first iteration, the node u with the highest priority may be added to the subset S by the influence estimator 225. For subsequent iterations, the node u at the top of the priority queue is retrieved. If its freshness value indicates that it has not been evaluated for this iteration, the marginal gain of adding u to S is estimated using the formula 5 above. If the estimated gain is less than a previously estimated maximum gain, then u is added back into the priority queue with the updated maximum gain value and freshness value. If the estimated gain is greater than the previously estimated maximum gain, then u is added to S, and the algorithm is repeated until S is full.

Where the instances of the graph 165 are generated using the REL IC model, the influence estimator 225 may determine the influence of a subset of nodes S identified by the influence query 145 using an estimator according to formula 6 where a is any non-increasing function:

$$\inf(\{G^i\}, S) = \Sigma_{(v,i) u \in s} \max \alpha(d_{uv}^i) = \Sigma_{(v,i) u \in s} \min \alpha(d_{uv}^i) \qquad (6)$$

For a subset of nodes S with only one node u, a node always influences itself, so the influence of that node is one. For the other nodes in the graph 165, a historic inverse probability estimator may be used to estimate the influence contribution of nodes that are a positive distance from u. For a subset of nodes S with more than one node u, the influence estimator 225 may create what is referred to as a union all-distances sketch. The influence estimator 225 may generate the union all-distances sketch from each of the combined all-distances sketches from the nodes in the subset of nodes S. For example, the influence estimator 225 may take the k smallest ranks from the combined all-distances sketches for each instance. The influence estimator 225 may then estimate the influence of the nodes in the subset of nodes S by applying the estimator of formula 6 to entries in the union all-distances sketch.

Where the influence query 145 is a request to determine a subset S of an indicated size having a maximum influence, the influence estimator 225 may determine the subset S using the greedy algorithm similarly as described above for the binary IC model. However, rather than estimate the influence of the subset at each iteration of the algorithm using the formula 5, the influence estimator may estimate the influence using the estimator of formula 6.

Figure 3:
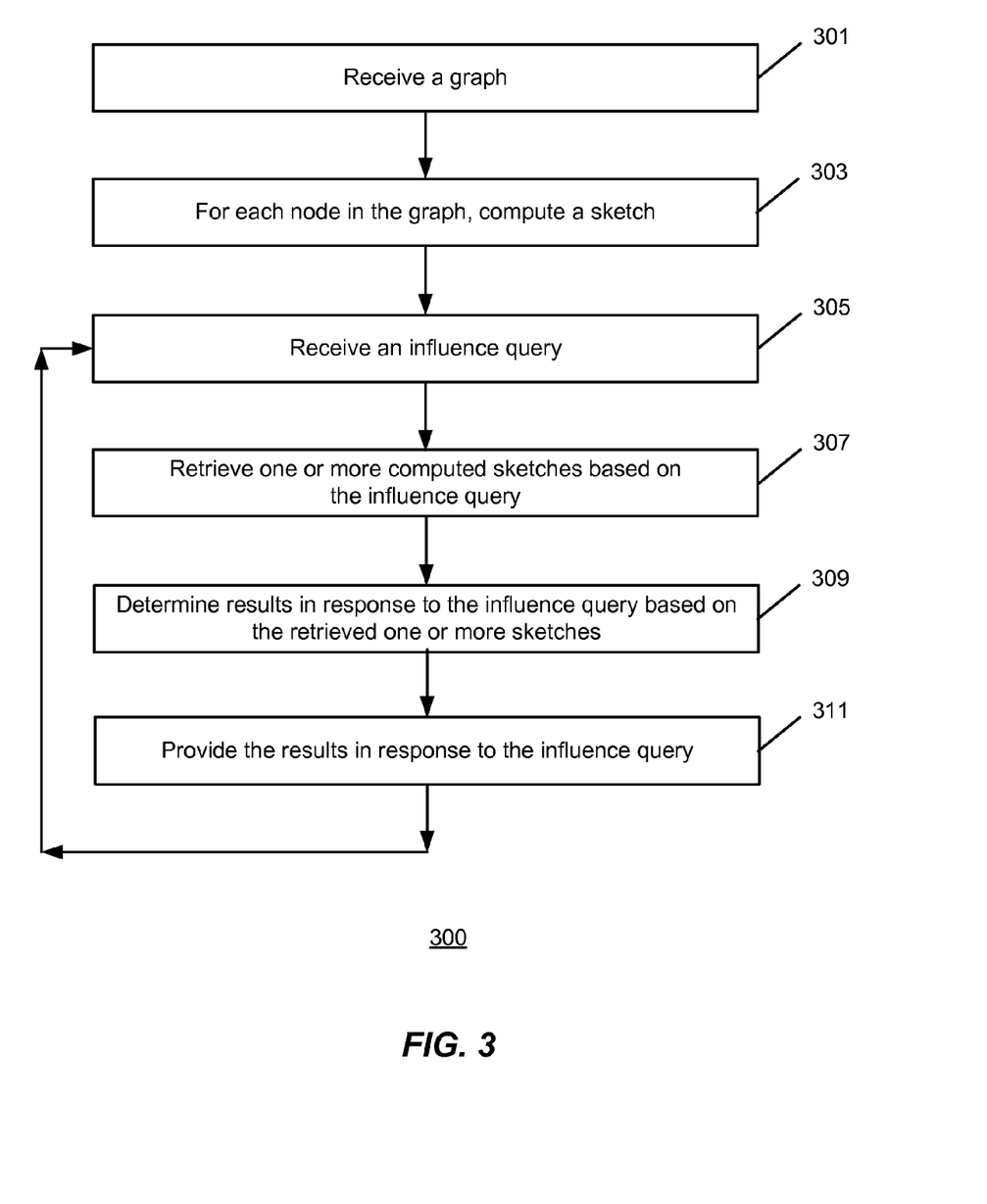
FIG. 3 is an operational flow of an implementation of a method for estimating the results of an influence query for a graph.

FIG. 3 is an operational flow of an implementation of a method 300 for estimating the results of an influence query for a graph. The method 300 may be implemented by the influence engine 180, for example.

A graph is received at 301. The graph 165 may be received by the influence engine 180 from the graph provider 160. The graph 165 may include a plurality of nodes and a plurality of edges. The graph may be a weighted or unweighted, and may be directed or undirected.

For each node in the graph, a sketch is computed at 303. Each sketch may be computed by the sketch generator 220. Depending on the implementation, each sketch may be a combined sketch and may be a combination of the sketches generated for the node across all instances of the received graph 165. Where an instance of a graph is generated using the binary IC model, the sketch generated for each node may be a combined reachability sketch. Where an instance of a graph is generated using the REL IC model, the sketch generated for each node may be a combined all-distances sketch. Other types of sketches may be used. The computed sketches may be stored by the sketch generator 220 as the sketch data 187.

An influence query is received at 305. The influence query 145 may be received by the influence engine 180 from the client device 110. Depending on the implementation, the influence query 145 may be a request to estimate the influence of a subset of nodes of the graph 165, or may be a request to estimate the subset of nodes of the graph 165 of a specified size with a maximum influence. Where the influence query 145 is a request to estimate the influence of a subset of nodes in the graph 165, the influence query 145 may include identifiers of the one or more nodes in the subset. Where the influence query is a request to estimate the subset of nodes of the graph 165 of a specified size with a maximum influence, the influence query 145 may include an indicator of the specified size.

One or more sketches are retrieved based on the influence query at 307. The one or more sketches may be retrieved from the sketch data 187 by the influence estimator 225. Where the influence query 145 is a request to estimate the influence of a subset of nodes of the graph 165, the influence estimator 225 may retrieve the sketches associated with the one or more nodes of the subset. Where the influence query 145 is a request to estimate the subset of nodes of the graph 165 of a specified size with a maximum influence, the influence estimator 225 may retrieve the sketches associated with every node of the graph 165.

Results are determined in response to the influence query based on the retrieved one or more sketches at 309. The results 186 may be estimates and may be determined by the influence estimator 225. How the results 186 are estimated may depend on the type of query 145 and the IC mode used to generate the graph instances.

For graph instances that are based on the binary IC model, the influence estimator 225 may estimate the influence of a subset of nodes by estimating the cardinality of union of the reachability sketches associated with each node in the subset. For graph instances that are based on the REL IC model, the influence estimator 225 may estimate the influence of a subset of nodes by applying an estimator, such as a historic inverse probability estimator, to the sketches associated with the nodes in the subset of nodes. Where the query 145 is a request to identify the subset of a specified size with the maximum influence, the influence estimator 225 may determine the subset using a greedy algorithm.

The generated results are provided in response to the influence query at 311. The generated results 186 may be provided to the client device 110 that originated the influence query 145 by the influence engine 180. After providing the generated results 186, the influence engine 180 may return to 305 where a new influence query 145 may be received from a client device 110.

Figure 4:
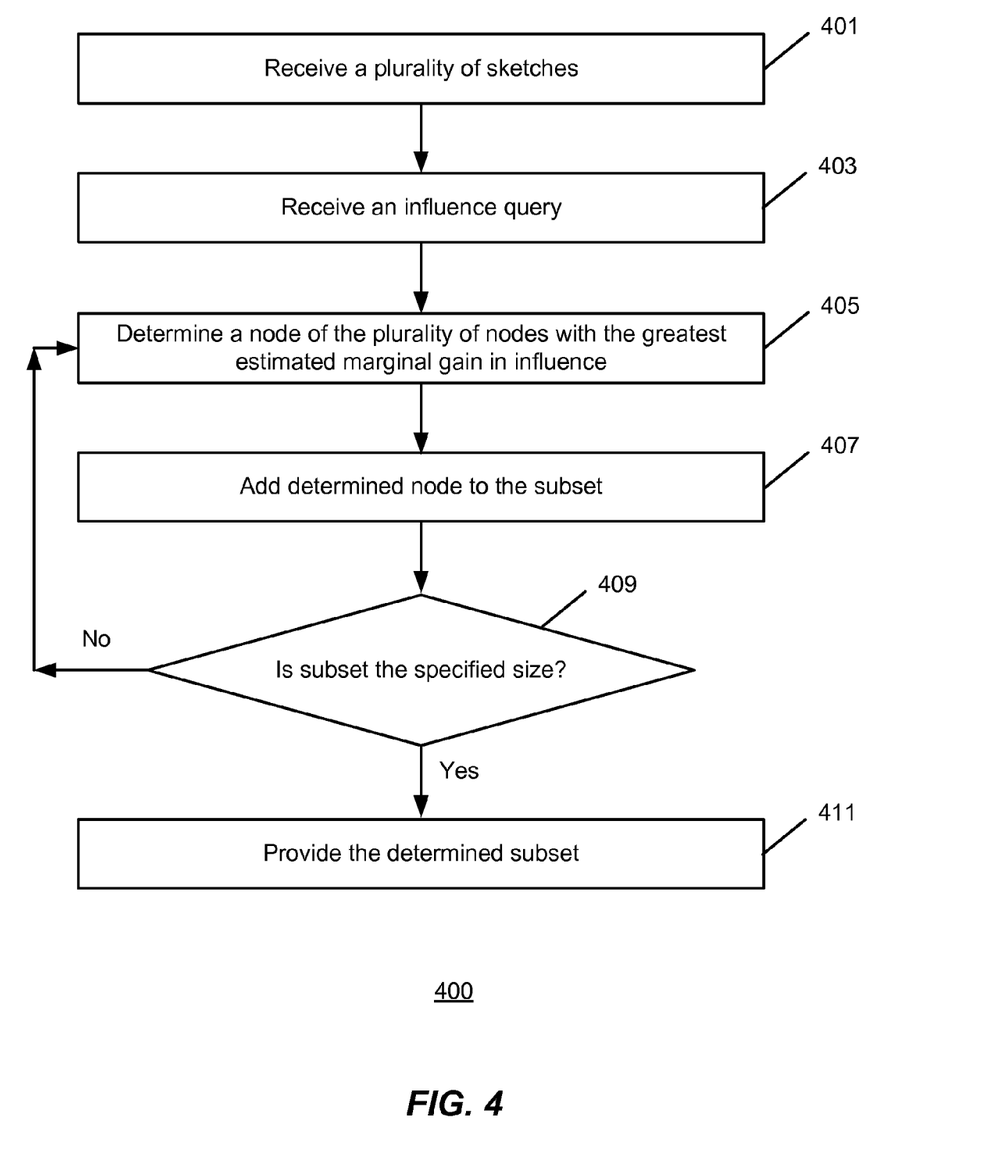
FIG. 4 is an operational flow of an implementation of a method for determining a subset of nodes from a graph of a specified size that maximizes an influence of the nodes in the subset of nodes.

FIG. 4 is an operational flow of an implementation of a method 400 for determining a subset of nodes from a graph of a specified size that maximizes an influence of the nodes in the subset of nodes. The method 400 may be implemented by the influence engine 180, for example.

A plurality of sketches is received at 401. The plurality of sketches may be received from the sketch data 187 by the influence estimator 225. Each sketch of the plurality of sketches may be associated with a node of a graph 165. The sketches may be combined sketches across all instances of the graph 165. Depending on the implementation, the combined sketches may be combined reachability sketches or may be combined all-distances sketches.

An influence query is received at 403. The influence query 145 may be received by the influence engine 180 from a client device 110. The influence query 145 may specify a size and may be a query for a subset of nodes from the graph 165 of the specified size that maximizes the influence of the nodes in the subset.

A node of the plurality of nodes with a greatest estimated marginal gain in influence is determined at 405. The node with the greatest estimated marginal gain may be determined by the influence estimator 225 using the sketches associated with each node in the graph 165.

The influence estimator 225 may determine the node with the greatest marginal gain by, for each node of the graph 165 that is not already in the subset, estimating the influence of the nodes already in the subset when the node being considered is included. The node that results in the largest increase in the estimated influence for the subset of nodes may then be determined to be the node with the greatest estimated marginal gain. Other methods may be used.

The determined node is added to the subset at 407. The determined node may be added to the subset of nodes by the influence estimator 225. A determination is made as to whether the subset of nodes is the specified size. If the subset of nodes is the specified size, then the method 400 may continue at 411. Otherwise, the method 400 may return to 405 where another node is selected.

Depending on the implementation, the influence estimator 225 may recompute the received sketches before or after adding the node to the subset of nodes. As nodes are added to the subset of nodes, the sketches become less accurate. Accordingly, the sketches may be recomputed to account for the nodes already added to the subset of nodes. The recomputation may be triggered by the calculated marginal gain falling below a threshold value, or after some number of nodes have been added to the subset, for example.

The determined subset of nodes is provided at 411. The determined subset of nodes may be provided by the influence engine in response to the influence query 145 as the results 186.

Figure 5:
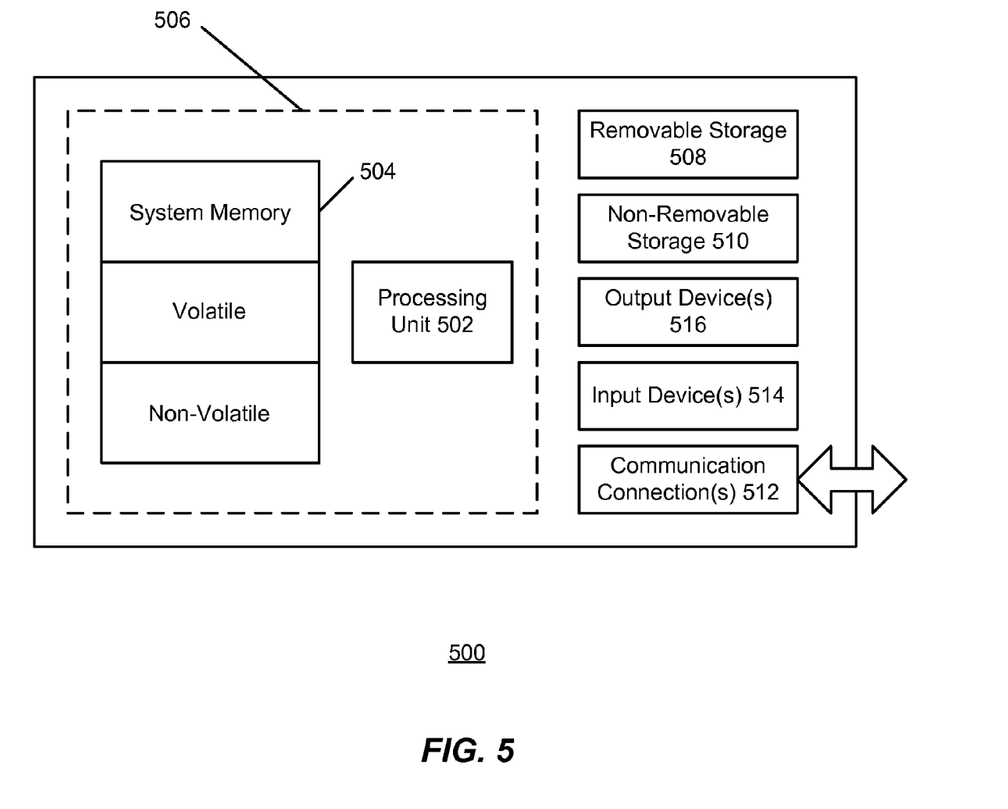
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a plurality of sketches by a computing device, wherein each sketch is associated with a node of a plurality of nodes of a graph;
   receiving an influence query for a subset of the plurality of nodes of a specified size having a maximum influence by the computing device, wherein the influence query is a query for an estimate of the subset of nodes of the plurality of nodes of the specified size with a maximum combined influence, wherein the influence of a node is a measure of how connected the node in the graph is to the other nodes of the graph;
   determining a first node of the plurality of nodes that when added to the subset of the plurality of nodes increases an influence of the subset of the plurality of nodes by a greatest amount using the sketch associated with the first node and the sketches associated with the nodes in the subset of the plurality of nodes by the computing device;
   adding the determined first node to the subset of the plurality of nodes by the computing device;
   determining that the subset of the plurality of nodes is of the specified size by the computing device; and
   in response to the determination, providing the subset of the plurality of nodes by the computing device.

2. The method of claim 1, wherein each sketch is one or more of an all-distances sketch or a reachability sketch.

3. The method of claim 1, further comprising:
   determining that the subset of the plurality of nodes is less than the specified size;
   determining an additional node of the plurality of nodes that when added to the subset of the plurality of nodes increases the influence of the subset of the plurality of nodes by a greatest amount using the sketch associated with the additional node and the sketches associated with the nodes in the subset of the plurality of nodes, wherein the additional node is different from the first node; and
   adding the determined additional node to the subset of the plurality of nodes.

4. The method of claim 1, further comprising determining the influence of the nodes of the subset of nodes based on a union of the sketches associated with each of the nodes in the subset of the plurality of nodes.

5. A system comprising:
   a computing device; and
   an influence engine adapted to:
      receive a graph comprising a plurality of nodes;
      for each node of the graph, compute a sketch;
      receive an influence query for a subset of the plurality of nodes of a specified size having a maximum influence, wherein the influence query is a query for an estimate of the subset of nodes of the plurality of nodes of the specified size with a maximum combined influence, wherein the influence of a node is a measure of how connected the node in the graph is to the other nodes of the graph;
      determine a first node of the plurality of nodes that when added to the subset of the plurality of nodes increases an influence of the subset of the plurality of nodes by a greatest amount using the sketch computed for the first node and the sketches computed for the nodes in the subset of the plurality of nodes;
      add the determined first node to the subset of the plurality of nodes;
      determine that the subset of the plurality of nodes is of the specified size; and
      in response to the determination, providing the subset of the plurality of nodes in response to the influence query.

6. The system of claim 5, wherein the influence engine is further adapted to:
   determine that the subset of the plurality of nodes is less than the specified size;
   determine an additional node of the plurality of nodes that when added to the subset of the plurality of nodes increases the influence of the subset of the plurality of nodes by a greatest amount using the sketch associated with the additional node and the sketches associated with the nodes in the subset of the plurality of nodes, wherein the additional node is different from the first node; and
   add the determined additional node to the subset of the plurality of nodes.

7. The system of claim 5, wherein the influence engine is further adapted to generate a plurality of instances from the graph, and the influence engine adapted to compute a sketch for a node comprises the influence engine adapted to:
   compute a sketch for the node for each of the generated instances; and
   combine the computed sketches for each of the generated instances.

8. The system of claim 5, wherein each sketch is one or more of an all-distances sketch or a reachability sketch.

* * * * *